Patented Feb. 22, 1949

2,462,400

UNITED STATES PATENT OFFICE 2,462,400

COPOLYMERS OF DIHYDRODICYCLOPENTA-DIENYL METHACRYLATE WITH ESTERS OF METHACRYLIC ACID

Fred W. Hoover, Wilmington, Del., assignor to E. I. du Pont de Nemours & Company, Wilmington, Del., a corporation of Delaware No Drawing. Application July 17, 1946, Serial No. 684,258

8 Claims. (Cl. 260—84)

This invention relates to new polymeric materials and to methods for their preparation. More particularly, this invention relates to new copolymers, to methods for their preparation, and to coating compositions containing such copolymers.

Currently available finish vehicles are not entirely satisfactory in all respects. Some have good drying potential but give films which are deficient in certain properties such as alkali, water, acid, and heat resistance, toughness, and flexibility. Other finish vehicles give films having satisfactory inertness but require quite high baking temperatures. Finish vehicles having a better balance of drying and film properties are highly desirable.

It is an object of this invention to provide new and useful polymeric materials. A further object of this invention is to provide new copolymers and methods for their preparation. A still further object is to provide new polymeric finish vehicles which have outstanding drying and film-forming properties. Other objects will appear hereinafter.

These and other objects of this invention are accomplished by the polymerization of a mixture of 20 to 50% of dihydrodicyclopentadienyl methacrylate and 80 to 50% of an ester of methacrylic acid with a saturated aliphatic monohydric alcohol having from 8 to 18 carbon atoms, in the presence of a solvent and a ploymerization catalyst. The resulting soluble, air-drying copolymers are new and form an important part of this invention.

In a preferred method of carrying out this invention, 100 parts of a mixture of 20 to 50% of dihydrodicyclopentadienyl methacrylate and 80 to 50% of an alkyl methacrylate derived from an alkanol having from 8 to 18 carbon atoms, 100 to 300 parts of an aromatic hydrocarbon solvent, and from 0.1 to 2 parts of an organic peroxy compound are charged into a reactor and the mixture heated under nitrogen at a temperature of 50 to 90° C. until polymerization of the monomers is substantially complete. The exact time of heating will, of course, depend upon the catalyst concentration and temperature employed. In general, under the conditions outlined above, a substantially complete conversion to a soluble copolymer is obtained in 2 to 10 hours.

The copolymers of this invention are unusually well adapted to certain important applications, such as ingredients of coating compositions, in that (1) they are readily and completely soluble in common, inexpensive solvents; (2) they form tough, flexible, alkali-resistant films which have excellent adhesion to base materials; and (3) they air-dry readily, particularly in the presence of small amounts of driers, and become solvent-resistant without losing their flexibility or toughness. The surprising fact that these air-drying polymers can be prepared in a soluble form in practically quantitative yields eliminates the necessity for removing and recovering unchanged monomers. This also makes possible the direct use of the reaction mixture as a coating composition after the polymerization has been completed.

The invention is further illustrated in the following examples in which parts are given by weight, unless otherwise specified.

Example I

Dihydrodicyclopentadienyl methacrylate used in this example is prepared as follows: A mixture of 311 parts of dicyclopentadiene, 202 parts of methacrylic acid, 28 parts of $BF_3.O(C_2H_5)_2$ (boron trifluoride-diethyl ether adduct) and 10 parts of hydroquinone is stirred with intermittent cooling, during which time the temperature ranges from 48–54° C. The resulting mixture is heated for two hours at 60° C. and then washed in turn with hot water, dilute sodium hydroxide solution, and cold water. The product is taken up in ether and dried over calcium sulfate hemihydrate. Three hundred and fifty-five parts of crude product distilling at 95–100° C./0.2–0.5 mm. is obtained. This crude material is washed free of hydroquinone, which was used as a stabilizer in the distillation, and then flash-distilled. Analysis: Found—carbon, 76.22%; hydrogen, 8.32%; saponification No. 253.9; calculated—carbon, 76.1%; hydrogen, 8.25%; saponification No. 256.5.

A mixture of 25 parts of dihydrodicyclopentadienyl methacrylate, 75 parts of decyl methacrylate, 200 parts xylene, and 1 part benzoyl peroxide is heated at 75–82° C. for 5¾ hours in an atmosphere of nitrogen. Precipitation of the copolymer by addition of methanol to an aliquot portion of the solution shows a practically quantitative copolymerization of the monomers. The solution resulting from the copolymerization has a viscosity of 0.65 poises at 25° C. (B-Gardner-Holdt Scale).

Coatings of the above copolymer are formed by flowing this solution to which was added 0.05% cobalt (on basis of solids) in the form of cobalt naphthenate, on steel panels and allowing the coatings to air-dry. These coatings are initially tacky and require about 10 hours to become tack-free. Moderate resistance to xylene is developed after 24 hours. The drying rate is greatly accentuated by baking at 100° C. and coating formed after two hours at 100° C. have very good solvent resistance and possess good hardness and excellent flexibility. An outstanding property of these coatings is their resistance to alkali and water. Thus, when these coatings are immersed in 10% alkali for one hour no appreciable change is noticed, whereas with an alkyd control the coating is completely dissolved.

Use of butyl methacrylate in place of decyl methacrylate in the above example results in a quantitative yield of soluble copolymer which air-dries readily. However, this product, in contrast to the dodecyl methacrylate-dihydrodicyclopentadienyl methacrylate copolymer, yields films which are markedly deficient in flexibility and toughness. Accordingly, the butyl methacrylate copolymer is not attractive for use in important coating applications.

*Example II*

A mixture of 24 parts of decyl methacrylate, 16 parts of dihydrodicyclopentadienyl methacrylate, 80 parts benzene, and 0.4 part benzoyl peroxide is refluxed for 5 hours in an atmosphere of nitrogen. At the end of this period, the polymer conversion is essentially 100%. The resulting solution has a viscosity of 4 poises (P-Gardner-Holdt Scale). The benzene solution of the polymer is diluted with xylene, cobalt drier added, and then flowed on sanded steel panels. After the solvent has evaporated, the resultant films are substantially tack-free. After air-drying overnight, these films acquire substantial resistance to xylene. Inert films are formed quickly by baking at 100° C. Such films baked 2 hours at 100° C. possess a high degree of solvent resistance. Although coatings of these materials do set up to an insoluble stage without cobalt, the rate of set-up is markedly increased when cobalt or other typical driers are used. The coatings obtained are hard, water-white, and glossy, and possess much better alkali and water resistance than alkyd coatings.

Replacement of decyl methacrylate in the above example with 16 parts of stearyl methacrylate results in the formation of a copolymer from which tough, flexible, solvent-resistant films are obtained upon air drying. Copolymers having these desirable properties are also obtained when 64 parts of 2-ethylhexyl methacrylate are used in place of the decyl methacrylate.

The copolymers of this invention are of outstanding utility for use in coating compositions in that they yield films which, upon air drying, are highly resistant to solvents and alkalis and yet exhibit excellent toughness and flexibility. It is to be noted that products having these characteristics are obtained only when the polymerization is carried out under certain specific conditions. For example, it is essential that the monomer contain from 20 to 50% of dihydrodicyclopentadienyl methacrylate and from 80 to 50% of an ester of methacrylic acid with a saturated aliphatic alcohol of 8 to 18 carbon atoms. Use of appreciably more than 50% of dihydrodicyclopentadienyl methacrylate results in copolymers which are brittle and yield films of inferior flexibility. Use of monomer mixtures containing more than 80% of a methacrylate of an alkanol having from 8 to 18 carbon atoms, on the other hand, results in soft copolymers which give films that mar so easily that they are of limited utility. As shown in Example I, copolymers derived from methacrylates of alkanols having less than 8 carbon atoms are unattractive for use in coating compositions since the resulting films are brittle. Methacrylic acid esters of alkanols having less than 18 carbon atoms copolymerize more readily with dihydrodicyclopentadienyl methacrylate and also yield tougher, more solvent-resistant copolymers than do methacrylates derived from aliphatic alcohols having more than 18 carbon atoms. Examples of alkyl methacrylates other than those used in the examples include dodecyl and hexadecyl methacrylates.

The soluble, air-drying copolymers of this invention are obtained in substantially quantitative yield only when the polymerization is carried out in the presence of a solvent for dihydrodicyclopentadienyl methacrylate. Attempts to prepare these products in reasonably high conversion by conventional emulsion or bulk polymerization techniques have always resulted in insoluble, crosslinked products which are not suitable for use in coating compositions and other important applications. Among the variety of inert organic solvents which can be used are aromatic hydrocarbons such as benzene and xylene, ketones such as acetone, ethers such as dioxane, and chlorinated hydrocarbons such as ethylene dichloride. Aromatic hydrocarbons are preferred because of their high solvent power, low cost, and the fact that the resultant polymer solutions are suitable for direct use in coating applications. This is particularly true with such higher boiling aromatic hydrocarbons as toluene and xylene.

Temperatures in the range of 0 to 120° C. can be used in the copolymerization reaction. In order to obtain a fairly rapid reaction rate and yet avoid any tendency toward the formation of insoluble, crosslinked products of little utility, it is preferable to employ a temperature range of 50° to 90° C.

Free radical types of polymerization catalysts, that is, catalysts which furnish free radicals under polymerization conditions, can be used in this invention. Among the preferred catalysts are organic peroxy compounds, such as benzoyl peroxide. Although the catalyst concentration can be varied widely, for example, from 0.05 to 10% based on the polymerizable materials, best results with regard to rate of polymerization and polymer quality are obtained by use of 0.1 to 2% of catalyst. Oxygen is a polymerization catalyst in small amounts, but the best copolymers are obtained when the reaction is carried out in the presence of an inert atmosphere such as nitrogen.

The polymerization time depends largely upon the temperature, catalyst, and catalyst concentration. In general, a substantially quantitative yield of good quality, soluble copolymers is obtained in 2 to 10 hours. It is desirable to continue the reaction until practically all the monomer is consumed in order to eliminate the necessity for monomer recovery and to assure the formation of high molecular weight products. The polymerization reaction, however, should not be continued for any appreciable length of time after the monomers have disappeared, particularly when higher temperatures are employed, in order to avoid a tendency toward insolubilization at this stage.

The products of this invention become highly solvent-resistant upon exposure to air, as this results in crosslinking, a reaction which is greatly enhanced by the addition of conventional driers, for example cobalt naphthenate. Finish vehicles, such as coating compositions, containing the soluble air-drying copolymerization products can be applied from solution or dispersion by any of the usual techniques known to the art. Such vehicles have good drying potential and yield films which are outstanding with regard to flexibility, toughness, alkali resistance, color, and hardness. This highly desirable combination of properties is obtained by the use of the selected comonomers and the critical comonomer ratios and polymerization conditions.

The copolymers of this invention are useful in a variety of applications, such as coatings for metal, wood, aluminum, fabric, and the like, as laminating resin ingredients, and as textile treating agents.

As many apparently widely different embodiments of this invention may be made without departing from the spirit and scope thereof, it is to be understood that I do not limit myself to the specific embodiments thereof except as defined in the appended claims.

I claim:

1. A copolymer containing from 20 to 50% of dihydrodicyclopentadienyl methacrylate and from 80 to 50% of an ester of methacrylic acid with a saturated aliphatic monohydric alcohol having from 8 to 18 carbon atoms.

2. A copolymer containing from 20 to 50% of dihydrodicyclopentadienyl methacrylate and from 80 to 50% of decyl methacrylate.

3. A method for the preparation of copolymers of dihydrodicyclopentadienyl methacrylate which comprises heating at a temperature of 50° to 90° C. a mixture of 20 to 50% of dihydrodicyclopentadienyl methacrylate and 80 to 50% of an ester of methacrylic acid with a saturated aliphatic monohydric alcohol having from 8 to 18 carbon atoms, in the presence of an aromatic hydrocarbon solvent and an organic peroxy compound polymerization catalyst.

4. A method for the preparation of copolymers of dihydrodicyclopentadienyl methacrylate which comprises heating at a temperature of 50° to 90° C. until polymerization is substantially complete a mixture of 20 to 50% of dihydrodicyclopentadienyl methacrylate and 80 to 50% of decyl methacrylate, in the presence of an aromatic hydrocarbon solvent, nitrogen and an organic peroxy compound polymerization catalyst.

5. A coating composition comprising an aromatic hydrocarbon solvent and in solution therein as the essential film-forming constituent a copolymer containing from 20 to 50% of dihydrodicyclopentadienyl methacrylate and from 80 to 50% of an ester of methacrylic acid with a saturated aliphatic monohydric alcohol having from 8 to 18 carbon atoms.

6. A coating composition comprising a cobalt drier, an aromatic hydrocarbon solvent, and in solution therein as the essential film-forming constituent a copolymer containing from 20 to 50% of dihydrodicyclopentadienyl methacrylate and from 80 to 50% of decyl methacrylate.

7. A copolymer containing from 20 to 50% of dihydrodicyclopentadienyl methacrylate and from 80 to 50% of 2-ethylhexyl methacrylate.

8. A copolymer containing from 20 to 50% of dihydrodicyclopentadienyl methacrylate and from 80 to 50% of stearyl methacrylate.

FRED W. HOOVER.

No references cited.